Nov. 7, 1933.  J. A. DERSHEM  1,933,662
WHEELED SCRAPER
Filed Oct. 15, 1931   5 Sheets-Sheet 1

Inventor
J. A. Dershem
By Lacey & Lacey
Attorneys

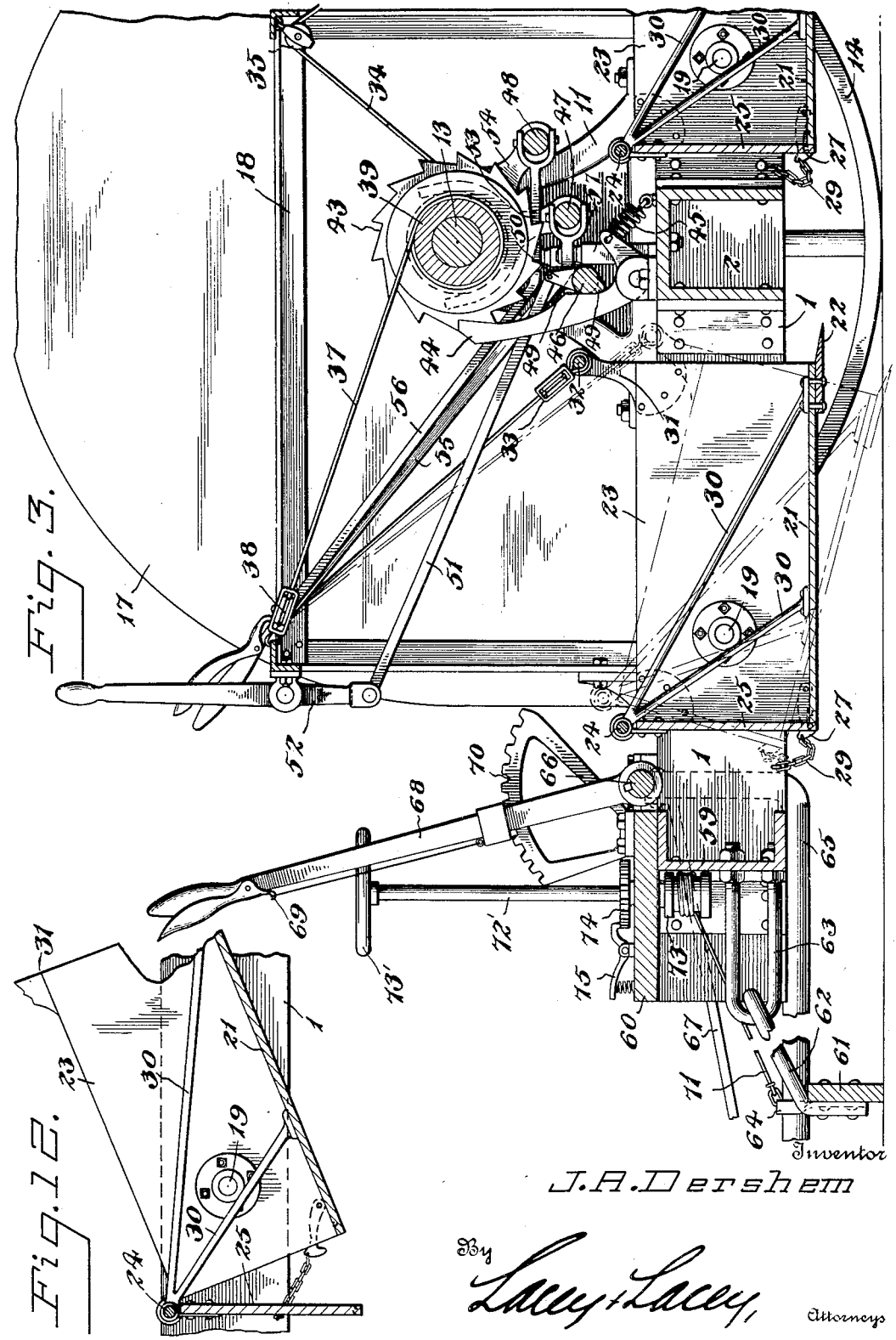

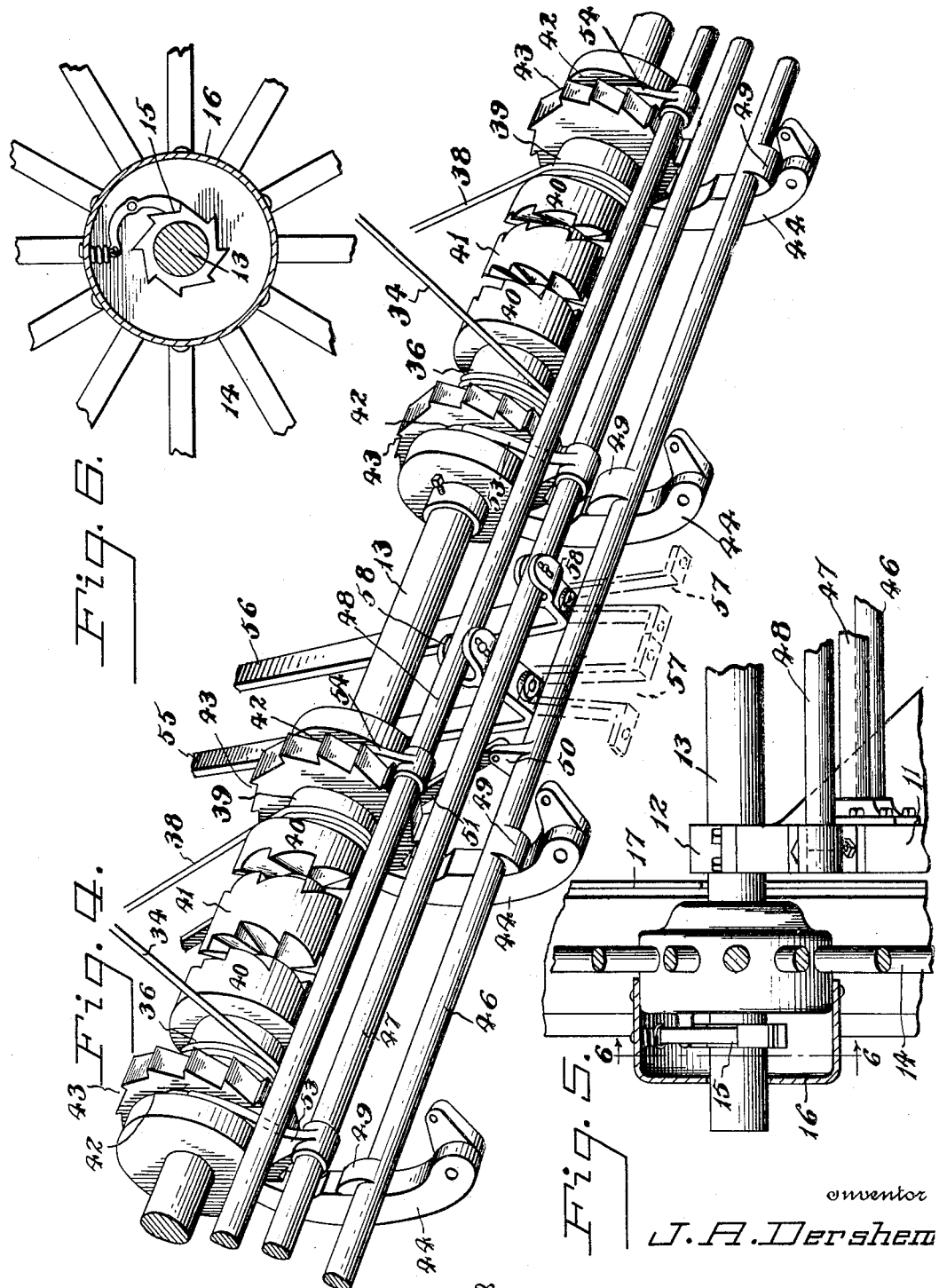

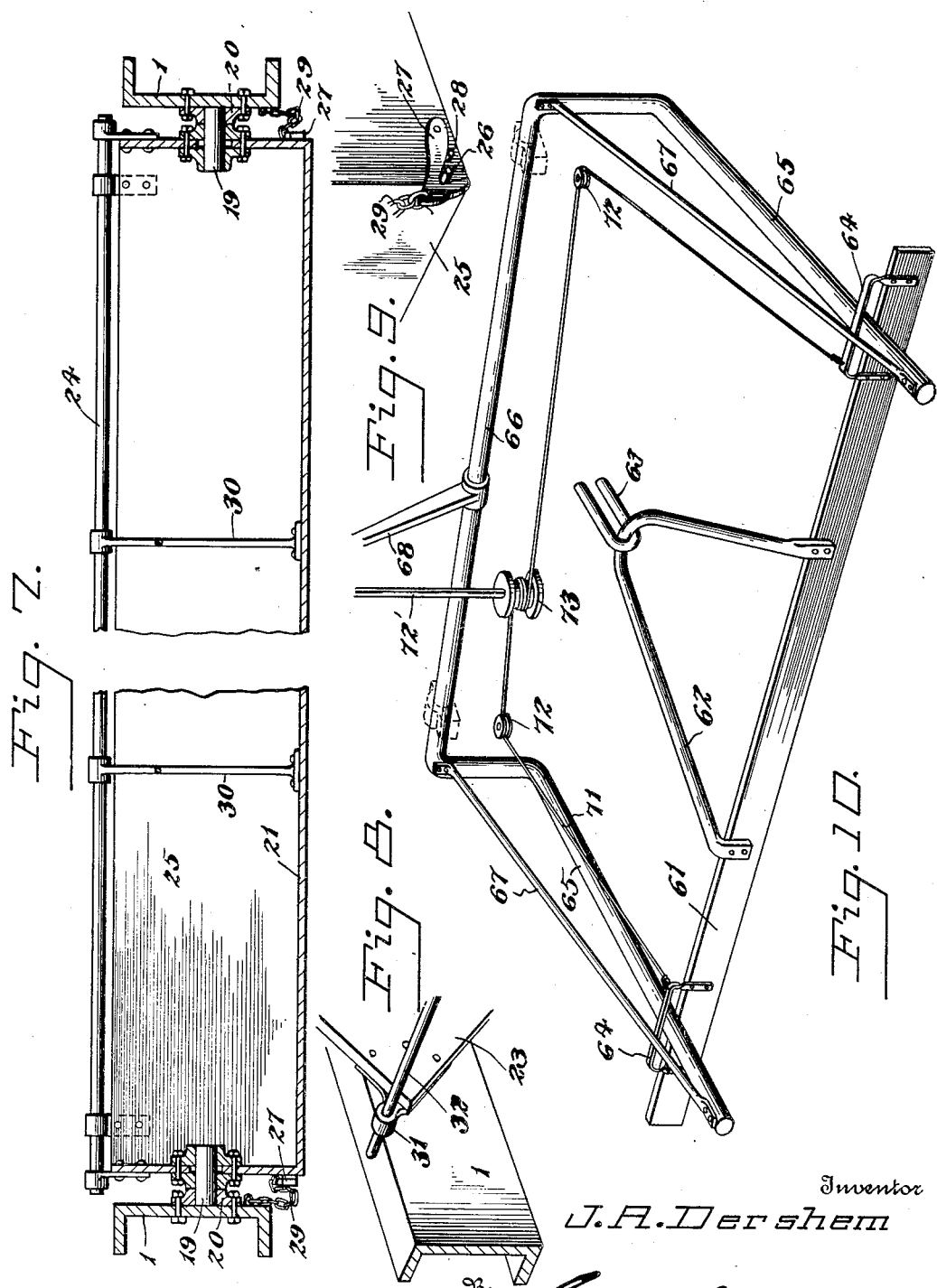

Patented Nov. 7, 1933

1,933,662

UNITED STATES PATENT OFFICE 1,933,662

WHEELED SCRAPER

James A. Dershem, Orchard, Colo.

Application October 15, 1931. Serial No. 569,039

4 Claims. (Cl. 37—127)

This invention relates to wheeled scrapers for use in excavating or forming ditches or performing other work where dirt is to be moved from one location and shifted to another. The invention provides means whereby scrapers may be readily supported in an elevated position, when loaded, and transported to a point of discharge, or easily adjusted to digging position and held firmly in the digging position while at work. The invention also provides means whereby the surface at the rear of the scrapers may be reduced to a level or the surplus surface dirt shifted to either side. Other objects of the invention will appear incidentally in the course of the following description, and the invention resides in certain novel features which will be particularly pointed out in the appended claims.

Figure 11:
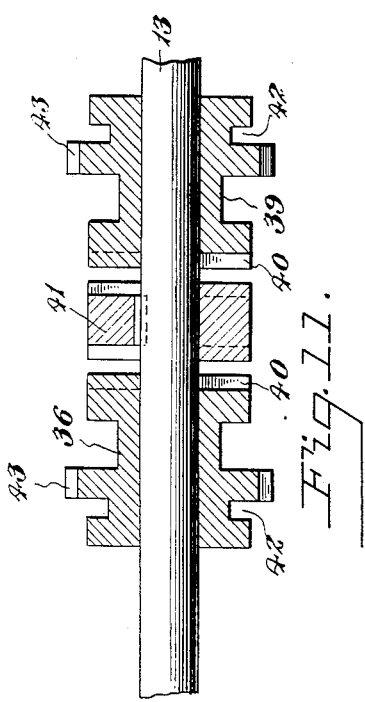
Figure 1:
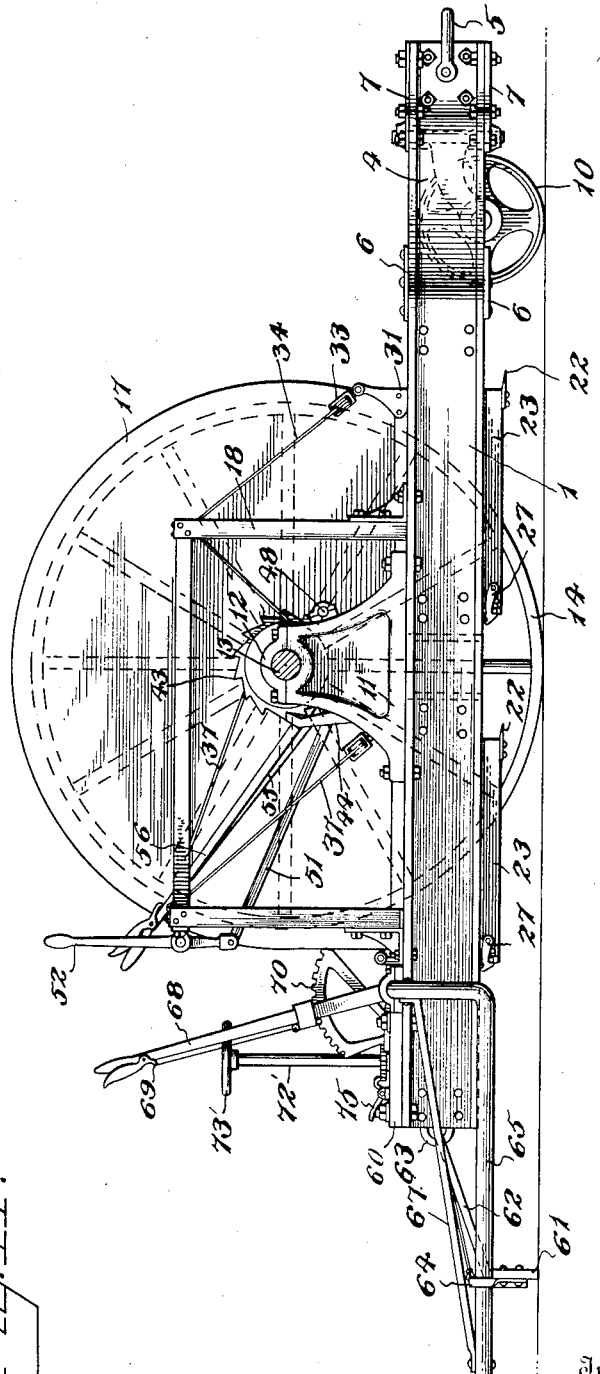
Figure 2:
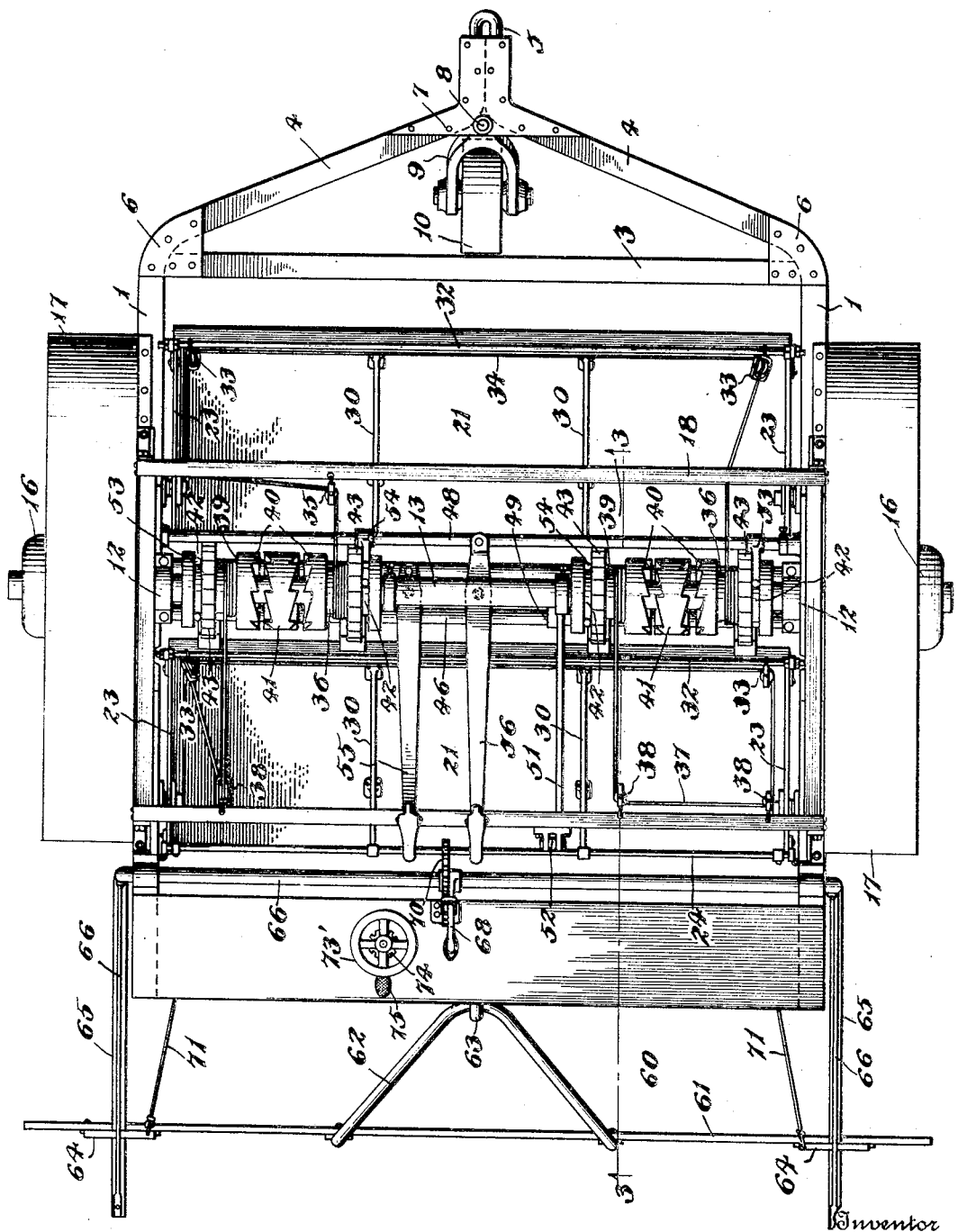

In the accompanying drawings,

Figure 1 is a side elevation of an apparatus embodying the invention, the near carrying-wheel being removed and the axle being shown in section, Fig. 2 is a top plan view of the machine, Fig. 3 is an enlarged longitudinal section on the line 3—3 of Fig. 2, Fig. 4 is an enlarged detail perspective view of the controlling mechanism, Fig. 5 is a view, partly in elevation and partly in section, showing the mounting of a ground wheel, Fig. 6 is a section on the line 6—6 of Fig. 5, Fig. 7 is a view, partly in elevation and partly in section, of one of the scraper pans, Fig. 8 is a detail perspective showing a part of the pan-supporting elements, Fig. 9 is a detail perspective view of the latch on a scraper pan, Fig. 10 is an enlarged perspective view of the evener blade and its supports, Fig. 11 is a longitudinal section through the gearing and clutch mechanisms for controlling the scraper pans, Fig. 12 is a detail section illustrating the manner of dumping a scraper pan.

The main frame of the machine comprises channel side bars 1 and an inverted channel bar 2 secured to and between the side bars between the ends thereof. The front ends of the side bars are connected by a front cross bar 3 and in advance of said cross bar 3 the front ends of the side bars converge, as shown at 4, and are firmly secured together, a clevis or other draft device 5 being secured to the united front ends of the bars for coupling the machine to a tractor. Reinforcing gusset plates 6 are secured to the upper and lower sides of the cross bar 3 and the side bars 1, at the junctions thereof, and other reinforcing gusset plates 7 are secured to the upper and lower sides of the front extremities of the frame bars. The rear ends of the gusset plates 7 project somewhat beyond the rear edges of the converging portions 4 of the side frame bars and in and between said projecting portions is mounted a pivot bolt 8 carrying a yoke 9 in which is mounted a wheel 10 which is adapted to run upon the ground and support the front end of the frame. Upon the side bars 1, approximately midway the length thereof, are secured pillars or standards 11 having bearings 12 at their upper ends in which an axle 13 is journaled. Upon the ends of the axle 13, at the outer sides of the bar, are mounted ground wheels 14, which may be of any preferred detail form, and are fitted loosely upon the axle but connected therewith through a pawl and ratchet device, shown at 15, in Figs. 5 and 6, whereby the differential movement of the wheels, when turning corners, will be accommodated and motion will be imparted to the axle when the machine is being drawn forwardly, but, during backward movement of the machine, the wheels will turn without imparting movement to the axle. The pawl and ratchet device is housed within a case 16 secured upon the hub of the ground wheel so that mud and other foreign matter cannot reach the mechanism and clog the action of the same. A hood 17 is preferably fitted over the upper portion of each ground wheel and rests upon the frame so that any mud or other matter which may be taken up by the ground wheels will not be thrown upon any of the operating mechanism to interfere with the action thereof.

An upper frame 18 is erected upon and firmly secured to the side bars 1 and is preferably of rectangular form, consisting of angle bars rigidly secured together and extending longitudinally and transversely of the machine at the front and rear of the axle. Scraper pans are provided at the front and at the rear of the central cross bar 2 of the main frame and each of these scraper pans is provided on its ends adjacent its back with trunnions 19 adapted to engage bearings 20 provided therefor upon the side bars of the main frame, as shown most clearly in Fig. 7. Each scraper pan comprises a bottom plate 21 having a cutting blade 22 secured to the underside thereof and projecting beyond the front edge thereof, as shown clearly in Fig. 3. The bottom 21 is preferably formed integral with the end members 23 and at the upper rear corner of each pan is secured a rod 24 upon which is hinged an end gate 25 which normally closes the back of the pan. At its ends, adjacent its lower edge, the end gate is provided with laterally extending pins 26 adapted to be engaged by hooks 27 pivoted upon the ends of the pan whereby the end gate will be held in closed position. A stop pin 28 is provided upon each end of the pan, below the adjacent hook, to prevent the hook dropping to such a position that it cannot engage the projection on the end gate, and a short chain or other flexible connection 29 is attached to the free end of each hook, and to the adjacent portion of the frame, so that, when the back of the pan is swung downwardly, the chains will be drawn taut and the hooks released from the pins 26 so that the end gate may open automatically and the load be discharged. Suspension braces 30, of the triangular form shown most clearly in Fig. 3, are hung upon the respective rods 24 and are secured at their lower ends to the bottom plates 21 of the respective pans so that the bottoms of the pans will be held against buckling under the weight of the load imposed thereon.

At the front corner of each end 23 of each pan is secured a bracket 31 and secured in and extending between these brackets is a rod 32. The ends of the rod 32 on the pan project laterally from the brackets so that they may, at times, rest upon the upper edges of the adjacent side bars 1, as shown in Fig. 8. This position will be assumed when the pan is to take up dirt. Supported upon the rods 32, at or near the ends thereof, are guide pulleys 33 and cables for supporting and adjusting the pans are trained around these pulleys and around other pulleys mounted upon the frame 18. The cable 34, which forms the means for supporting and adjusting the front pan, passes from the pulleys 33 to cooperating pulleys 35 on the frame 18 and then passes to winding drums 36, which are mounted loosely upon the axle 13, and has its ends secured to the respective drums to wind thereon, as will be understood. A cable 37 is trained around the pulleys 33 on the rear pan and thence passes to and about guide pulleys 38, on the frame 18, and then to winding drums 39 mounted loosely on the axle 13, the ends of the cable being secured to said drums, to wind thereon, as will be understood. Upon reference to Figs. 2 and 4, it will be noted that two drums 36 and two drums 39 are provided so that both ends of both cables may be secured and wound or unwound, the corresponding drums occupying the same relative positions upon the axle, each drum 36 being at the right of the adjacent drum 39 and one drum 39 and one drum 36 being nearer the central longitudinal line of the machine. The winding drums are constructed at their opposed ends with clutch hubs 40, the clutching jaws of the hubs being oppositely disposed, as shown clearly in Fig. 2. Between the adjacent opposed clutch hubs 40, clutch collars 41 are secured upon the axle 13 so as to rotate therewith and these clutch collars will impart rotation to the respective drums accordingly as one or the other clutch hub is engaged with the clutch collar, as will be understood. On its side remote from the clutch hub, each winding drum is constructed with an annular groove 42, and between said groove and the winding portion of the drum ratchet teeth 43 are formed circumferentially about the drum, as shown in Figs. 3 and 4. Pawls 44 are fulcrumed in suitable brackets provided therefor on the top of the central cross bar 2 in position to engage the respective ratchet teeth 43 and thereby normally prevent retrograde movement of the respective winding drums, the pawls being held to the ratchets by contractile springs 45 attached to the ends of the pawls and to the top of the cross bar, as shown in Fig. 3. Disposed between the axle 13 and the cross bar 2, and below the several ratchets, winding drums and clutch members, is a rock shaft 46 and slidable rods 47 and 48, all of which are supported by the pillars 11 upon the main frame. The rock shaft 46 is provided with cam projections 49 arranged one adjacent each of the pawls 44, so as to bear upon the same and press it out of engagement with the adjacent ratchet when the shaft is rocked in the proper direction, the cam projections which engage the pawls controlling the drums 36 being arranged to project in the opposite direction from the cam projections engaging the pawls which control the drums 39. A crank arm 50 is provided on the rock shaft 46, between the ends thereof, and to this crank is pivoted the front end of a rod 51 which extends rearwardly and upwardly and has its rear end pivoted to the lower end of a hand lever 52 which is mounted upon the frame 18 in any convenient manner. Secured to the rod 47 are forks 53 which engage the annular grooves 42 of the winding drums 36 and secured to the rod 48 are similar forks 54 which engage the annular grooves 42 of the drums 39. It will thus be evident that if the rod 47 or the rod 48 be moved endwise, the forks secured thereto will be likewise moved and the corresponding winding drums shifted so as to be locked to or released from the adjacent clutch collar and driving gear 41. To shift the rods, hand levers 55 and 56 are provided and are fulcrumed upon brackets, indicated at 57, erected upon the cross bar 2 adjacent the rods, as will be understood upon reference to Figs. 2 and 4. The front ends of the hand levers are forked, as shown at 58, to span the respective rods 47 and 48 and are pivoted thereto, as indicated in Fig. 4.

Assuming the front pan is to be set in working position, the lever 52 is pushed forward at its upper end thereby rocking the shaft 46 in such direction that the upper cams 49 will act upon the adjacent pawls 44 and release them from the corresponding ratchets 43 so that the winding drums 36 may rotate in a proper direction to permit the cable 34 to unwind whereupon the front scraper pan will turn about its pivotal support 19 and will present its blade to the surface of the ground so that, if the machine be drawn forward, the surface soil will be taken up and loaded into the pan. When the pan has been loaded, and the load is to be carried to the dumping place, the lever 55 is rocked toward the right hand, which is the bottom of Fig. 2, and the rod 47 is thereby shifted to the left so that the clutch hubs 40 of the drums 36 will be carried into engagement with the clutch collar 41 and, as the travel of the machine continues, the rotation of the axle will be transmitted through the clutch collars and engaged clutch hubs to wind the cable 34 upon the drums 36 and thereby raise the front side of the front scraper pan. As the drums start to wind the cable 34, the lever 52 is shifted so as to rock the shaft 46 in a direction to permit the pawls 44 to engage the ratchets 43 of the drums 36 and release the pawls engaging the ratchets controlling the drums 39 whereupon the cable 37 may unwind and permit the rear scraper pan to rock into the digging position. When the front pan has been returned to a level position, the rotation of the drums 36 will be stopped by shifting their clutch hubs out of engagement with the driving clutch collars, and the load may then be carried as long as the pawls 44 remain in engagement with the corresponding ratchets 43. When the rear pan has taken up a load, the lever 56 is rocked to the left thereby causing the drums 39, with their corresponding clutch hubs, to be shifted to the respective clutch collars 41 and engaged therewith whereupon the cable 37 will be wound and the rear pan lifted to load-carrying position. When the load in the front pan is to be dumped, the winding drums 36 are again shifted into engagement with the driving gear 41 so that an additional vertical movement will be imparted to the front of the pan, the rear thereof being consequently moved downwardly, as shown in Fig. 12, and this movement will cause the chains 29 to become taut and release the hooks 27 so that the end gate may open and the load be discharged. After the front pan has discharged its load, the rear pan may be caused to discharge its load in a corresponding manner. It will be understood that when the drums are out of engagement with the driving gear, the corresponding pawls and ratchets will be engaged and rotation of the drums will thereby be prevented so that there will be no shifting of the pans while they are at work or while they are carrying a load.

Upon the rear ends of the side bars 1 and upon the rear cross bar 59 of the main frame is secured a platform 60 upon which the operator stands while the machine is in use. A leveler or evener bar 61 is disposed at the rear of the platform and extends across and laterally somewhat beyond the path of the machine, said bar consisting of a plate of suitable material, set on edge, and connected with the rear cross bar 59 by draft devices consisting of a central clevis 62 secured to the evener bar and engaged through a loop 63 secured in and projecting rearwardly from the cross bar 59. It will be readily noted that the draft of the machine is thus transferred to the evener bar to draw it over the ground at the rear of the machine, and the clevis may be shifted through the loop to set the bar in a desired angular position. At the ends of the evener bar 61, loops or inverted stirrups 64 are secured thereto and rise above the upper edge thereof to receive the ends of the lifting arms 65 projecting rearwardly from the downturned ends of a rock shaft 66 which is journaled in suitable bearings upon the frame at the front edge of the platform 60, braces 67 extending from the shaft to the ends of the arms to resist sagging of the arms. A hand lever 68 is secured to the rock shaft 66, between the ends thereof, so that, by shifting the lever, the arms 65 may be rocked upwardly or downwardly and the evener bar consequently raised from the ground to an inactive position, as when the machine is being shifted from point to point, or lowered to the ground so as to ride on the surface of the same and reduce the same to a level. The lever 66 is, of course, equipped with the usual latch 69 cooperating with a holding segment or rack 70 so that the parts will be held in the set position and it is to be understood that each of the levers 52, 55 and 56 are equipped with the usual latch mechanism for holding them in the position in which they may be set. The loops 64 are somewhat elongated, as shown in Fig. 10, so that there may be relative lateral movement between the evener bar and the lifting arms so that the bar may be set in an angular position to deflect the surface earth to one or the other side. To accomplish such adjustment, I provide a cable 71 which has its ends secured to the respective loops 64 and its intermediate portion trained about guide pulleys 72, mounted on the underside of the platform, and secured to and wrapped around a drum 73, also mounted below the platform, whereby, if the drum be rotated, one end portion of the cable will be caused to wind thereon and the other end portion unwind therefrom so that the ends of the evener bar will be advanced or retracted and the bar thereby set in an oblique position with respect to the machine. The winding drum 73 is secured on the lower end of a vertical shaft 72′, which extends upwardly through the platform, and is equipped, at its upper end, with a hand wheel 73′. Just above the platform, a holding rack 74 is secured upon the shaft, and a foot latch 75 is mounted on the platform in position to engage this rack and hold the shaft in a set position so that the angular disposition of the evener bar will be maintained.

Having thus described the invention, I claim,

1. A machine of the class described comprising a main frame including spaced side bars, standards secured to the side bars at approximately the center of the frame, an axle journaled in the upper ends of said standards, ground wheels mounted on the ends of the axle and adapted to rotate the same, scraper pans mounted between the side bars at the front and at the rear of the axle and adjacent thereto, means mounted on the axle and driven thereby for selectively raising and lowering the pans, and means for setting the last-mentioned means.

2. A machine of the class described comprising a main frame, an axle mounted thereon, ground wheels mounted on the axle and adapted to rotate the same, scraper pans mounted in the frame at the front and at the rear of the axle, driving gears secured on the axle, winding drums mounted loosely upon the axle at opposite sides of the respective driving gears, cables having their ends secured to and wound upon the respective drums, means whereby one of said cables will support the front end of the front scraper pan, means whereby the other cable will support the front end of the rear pan, means for preventing retrograde movement of the drums, means for selectively releasing the last-mentioned means, and means for selectively shifting the drums into engagement with the driving gears.

3. A machine of the class described comprising a main frame, an axle mounted thereon, ground wheels mounted on the ends of the axle and adapted to rotate the same, a supplemental frame erected on the main frame, scraper pans tiltably mounted in the main frame at the front and at the rear of the axle, pulleys disposed at the front ends of the respective pans, other pulleys on the supplemental frame, driving gears secured on the axle, winding drums mounted loosely upon the axle at opposite sides of the respective driving gears, cables trained about the several pulleys and having their ends secured to corresponding drums to wind thereon, means for normally preventing unwinding of the drums, means for releasing said means, and means for selectively shifting the winding drums into engagement with the driving gears.

4. A machine of the class described comprising a main frame, an axle mounted thereon, ground wheels mounted on the ends of the axle and adapted to rotate the same, scraper pans tiltably mounted in the main frame at the front and at the rear of the axle, pairs of winding drums loosely mounted upon the axle, cables connected with the front ends of the scraper pans and secured to the drums to wind thereon, driving gears secured upon the axle, there being a winding drum at each side of each driving gear, a ratchet on one end of each drum, means for shifting the drums selectively into engagement with the driving gears whereby the drums will be rotated with the axle, pawls arranged to engage the respective ratchets to normally prevent unwinding of the drums, a rock shaft mounted on the main frame adjacent the pawls, oppositely extending cams on said shaft arranged to bear upon the respective pawls, and means for rocking said shaft in either direction whereby selected pawls will be released from the coacting ratchets.

[L. S.] JAMES A. DERSHEM.